(12) United States Patent
Hoffmann et al.

(10) Patent No.: US 7,103,386 B2
(45) Date of Patent: Sep. 5, 2006

(54) ANTENNA STEERING AND HIDDEN NODE RECOGNITION FOR AN ACCESS POINT

(75) Inventors: John E. Hoffmann, Indialantic, FL (US); Kevin P. Johnson, Palm Bay, FL (US); George Rodney Nelson, Jr., Merritt Island, FL (US); John A. Regnier, Palm Bay, FL (US)

(73) Assignee: IPR Licensing, Inc., Wilmington, DE (US)

( * ) Notice: Subject to any disclaimer, the term of this patent is extended or adjusted under 35 U.S.C. 154(b) by 75 days.

(21) Appl. No.: 10/870,702

(22) Filed: Jun. 17, 2004

(65) Prior Publication Data

US 2005/0075142 A1   Apr. 7, 2005

Related U.S. Application Data

(60) Provisional application No. 60/479,701, filed on Jun. 19, 2003.

(51) Int. Cl.
*H04M 1/00* (2006.01)
(52) U.S. Cl. .................. 455/562.1; 455/41.2; 370/338
(58) Field of Classification Search .................. 455/25, 455/69, 562.1, 41.2; 342/367–368, 371–372; 343/702; 370/338
See application file for complete search history.

(56) References Cited

U.S. PATENT DOCUMENTS

| | | | |
|---|---|---|---|
| 3,846,799 A | 11/1974 | Gueguen | 343/833 |
| 5,617,102 A | 4/1997 | Prater | 342/374 |
| 5,903,826 A | 5/1999 | Nowak | 455/277.1 |
| 5,905,473 A | 5/1999 | Taenzer | 343/834 |
| 6,009,124 A | 12/1999 | Smith et al. | 375/267 |
| 6,229,480 B1 | 5/2001 | Shintani | 342/359 |
| 6,445,688 B1 | 9/2002 | Garces et al. | 370/334 |
| 6,486,832 B1 | 11/2002 | Abramov et al. | 343/700 MS |
| 6,493,545 B1 | 12/2002 | Sugaya | 455/272 |
| 6,515,635 B1 | 2/2003 | Chiang et al. | 343/834 |
| 6,531,985 B1 | 3/2003 | Jones et al. | 343/702 |
| 6,611,231 B1 | 8/2003 | Crilly et al. | 342/378 |
| 6,640,087 B1 | 10/2003 | Reed et al. | 455/11.1 |
| 2002/0008672 A1 | 1/2002 | Gothard et al. | 343/893 |

(Continued)

OTHER PUBLICATIONS

Ohira et al., Electronically Steerable Passive Array Radiator Antennas for Low-Cost Analog Adaptive Beamforming, 0-7803-6345-0/00, 2000, IEEE.

(Continued)

*Primary Examiner*—Lee Nguyen
(74) *Attorney, Agent, or Firm*—Allen, Dyer, Doppelt, Milbrath & Gilchrist, P.A.

(57) ABSTRACT

A method for operating an access point in a wireless local area network (WLAN) is provided. The access point includes a directional antenna for communicating with a plurality of remote stations, and the directional antenna includes a plurality of antenna patterns. The method includes creating an antenna database by associating between the access point and each remote station a respective measured signal quality corresponding to the plurality of antenna patterns. The respective measured signal qualities are determined by the access point based upon communications with each remote station. The method further includes determining for each remote station a preferred antenna pattern based upon the antenna database, and selecting a remote station and the corresponding preferred antenna pattern to communicate with. It is also determined based upon the antenna database and prior to communicating with the selected remote station, if any non-selected remote stations have the potential of not being aware when such communications actually occurs.

30 Claims, 13 Drawing Sheets

U.S. PATENT DOCUMENTS

| | | | |
|---|---|---|---|
| 2002/0036586 A1 | 3/2002 | Gothard et al. | 342/374 |
| 2002/0051430 A1 | 5/2002 | Kasami et al. | 370/319 |
| 2002/0105931 A1 | 8/2002 | Heinonen et al. | 370/338 |
| 2003/0007473 A1 | 1/2003 | Strong et al. | 370/338 |
| 2003/0048770 A1* | 3/2003 | Proctor | 370/349 |
| 2003/0152086 A1 | 8/2003 | El Batt | 370/400 |
| 2003/0228857 A1 | 12/2003 | Maeki | 455/278.1 |
| 2004/0009794 A1 | 1/2004 | Proctor et al. | 455/575.7 |
| 2004/0033817 A1 | 2/2004 | Gorsuch et al. | 455/562.1 |
| 2004/0053634 A1 | 3/2004 | Gainey et al. | 455/522 |
| 2004/0102157 A1 | 5/2004 | Lewis | 455/63.4 |
| 2004/0114535 A1 | 6/2004 | Hoffmann et al. | 370/252 |
| 2004/0130487 A1 | 7/2004 | Hoffmann et al. | 342/359 |
| 2004/0150568 A1 | 8/2004 | Chiang et al. | 343/702 |
| 2004/0157611 A1 | 8/2004 | Smith et al. | 455/445 |
| 2004/0196822 A1 | 10/2004 | Proctor, Jr. | 370/349 |
| 2004/0259597 A1 | 12/2004 | Gothard et al. | 455/562.1 |

OTHER PUBLICATIONS

Scott et al., Diversity Gain From a Single-Port Adaptive Antenna Using Switched Parasitic Elements Illustrated with a Wire and Monopole Prototype, IEEE Transactions on Antennas and Propagation, vol. 47, No. 6, Jun. 1999.

King, The Theory of Linear Antennas, pp. 622-637, Harvard University Press, Cambridge, Mass., 1956.

Lo et al., Antenna Handbook: Theory, Applications and Design, pp. 21-38, Van Nostrand Reinhold Co., New York, 1988.

* cited by examiner

ANTENNA STEERING AND HIDDEN NODE RECOGNITION FOR AN ACCESS POINT

RELATED APPLICATION

This application claims the benefit of U.S. provisional application Ser. No. 60/479,701, filed Jun. 19, 2003, the entire contents of which are incorporated herein by reference.

FIELD OF THE INVENTION

The present invention relates to the field of wireless local area networks, and in particular, to an antenna steering algorithm for an access point operating within a wireless local area network.

BACKGROUND OF THE INVENTION

Various standards allow remote stations, such as portable computers, to be moved within a wireless local area network (WLAN) and connect via radio frequency (RF) transmissions to an access point (AP) that is connected to a wired network. The wired network is often referred to as a distribution system. The various standards include the IEEE 802.11 standard and its corresponding letter revisions thereof, such as 802.11b and 802.11g, for example.

A physical layer in the remote stations and in the access point provides low level transmissions by which the stations and the access point communicate. Above the physical layer is a media access control (MAC) layer that provides services, such as authentication, deauthentication, privacy, association and disassociation, for example.

In operation, when a remote station comes on-line, a connection is first established between the physical layers in the station and the access point. The MAC layers can then connect. Typically, for the remote stations and the access point, the physical layer RF signals are transmitted and received using monopole antennas.

A monopole antenna radiates in all directions, generally in a horizontal plane for a vertically oriented element. Monopole antennas are susceptible to effects that degrade the quality of communication between the remote station and the access point, such as reflection or diffraction of radio wave signals caused by intervening objects. Intervening objects include walls, desks and people, for example. These objects create multi-path, normal statistical fading, Rayleigh fading, and so forth. As a result, efforts have been made to mitigate signal degradation caused by these effects.

One technique for counteracting the degradation of RF signals is to use two antennas to provide diversity. The two antennas are coupled to an antenna diversity switch in one or both of the remote stations and the access point. The theory behind using two antennas for antenna diversity is that, at any given time, at least one of the antennas is likely receiving a signal that is not suffering from the effects of multi-path. Consequently, this antenna is the antenna that the remote station or access point selects via the antenna diversity switch for transmitting/receiving signals. Nonetheless, there is still a need to address the degradation of RF signals between the remote stations and an access point in a wireless local area network.

In addition, another problem arises when a remote station is not aware that the access point and a selected remote station are communicating with one another, and this remote station attempts to communicate with the access point. As a result, collisions occur at the access point. This leads to a situation called the hidden node problem, which is due to the fact that not every remote station in a wireless local area network is able to communicate directly with every other remote station in the network.

SUMMARY OF THE INVENTION

In view of the foregoing background, an object of the present invention is to improve communications between an access point and remote stations within a wireless local area network, particularly with respect to hidden nodes.

An improvement over simple diversity is provided through an antenna steering process for access points (i.e., wireless gateways) used in wireless local area networks. Directional antennas improve the throughput of the network, and increase the range between the access point and the remote stations (i.e., wireless user devices). A directional antenna provides a higher signal-to-noise ratio than an omni-directional antenna in most cases, thus allowing the link to operate at higher data rates.

The antenna steering process may be resident in the media access control (MAC) layer of the access point, and selects a best or preferred directional antenna pattern based on signal quality metrics available from the physical layer upon receiving signals from the remote stations.

According to the principles of the present invention, during processes such as registration, authentication or subsequent data exchanges between the access point and a selected remote station, a preferred direction for the steered access point antenna is determined. In one embodiment, software or firmware operating at the access point makes this determination. The access point antenna control software/firmware may build a database that includes the identity of the remote station and the antenna direction associated with that station for achieving optimum communications performance.

Hardware may be employed to operate with inherent diversity selection circuitry in typical 802.11 equipment for selecting the preferred directional antenna angle. The access point may use signaling to cause the remote stations to transmit a probe response signal, wherein the access point measures the signal quality of the probe response signal. The access point may compare metrics corresponding to signals received from the remote stations in a directional antenna mode against metrics corresponding to signals received from the remote stations in an omni-directional mode to determine if a new antenna scan should be performed. If the access point determines that hidden nodes are present, it may invoke a protection mechanism using request-to-send/clear-to-send (RTS/CTS) messaging as defined in the 802.11 standard, for example.

The benefits of augmenting the access point with a directional antenna are two-fold: improved throughput to individual remote stations and an ability to support more users in the network. In most RF environments, the signal level received at the remote station can be improved by having the access point transmit using a shaped antenna beam pointed in the direction of the station. The shaped antenna beam may provide a 3–5 dB gain advantage, for example, over the omni-directional antenna typically deployed with an access point. The increased signal level allows the link between the access point and the remote station to operate at higher data rates, especially at the outer band of the coverage area. The directional antenna steering process is resident in the access point to support operation with the remote stations.

More particularly, the present invention is directed to a method for operating an access point in a wireless local area network (WLAN), with the access point comprising a directional antenna for communicating with a plurality of remote stations, and the directional antenna comprises a plurality of antenna patterns. The method comprises creating an antenna database by associating between the access point and each remote station a respective measured signal quality corresponding to the plurality of antenna patterns. The respective measured signal qualities are determined by the access point based upon communications with each remote station.

The method further comprises determining for each remote station a preferred antenna pattern based upon the antenna database, and selecting a remote station and the corresponding preferred antenna pattern to communicate with. Based upon the antenna database and prior to communicating with the selected remote station, it is determined if any non-selected remote stations have the potential of not being aware when such communications actually occurs.

Determining if any non-selected remote stations have the potential of not being aware when such communications actually occurs comprises comparing the measured signal quality associated with the preferred antenna pattern for the selected remote station with the respective signal qualities associated with the non-selected remote stations when using the same preferred antenna pattern. The measured respective signal qualities may comprise at least one of a received signal strength indication, a carrier-to-interference ratio, an energy-per-bit ratio, and a signal-to-noise ratio.

The plurality of antenna patterns may comprise an omni antenna pattern, and if it is determined that at least one of the non-selected remote stations would not be aware when such communications actually occurs, then the method may further comprise transmitting an unsolicited clear-to-send message via the omni antenna pattern to the plurality of remote stations. The clear-to-send message has an unused address that does not correspond to any of the plurality of remote stations.

Alternatively, if it is determined that at least one of the non-selected remote stations would not be aware when such communications actually occurs, then the method may further comprise transmitting in a forward link direction a request-to-send message via the omni antenna pattern to the plurality of remote stations, receiving a clear-to-send message from the selected remote station, transmitting a data frame to the selected remote station, and receiving an acknowledgement message from the selected remote station. For a reverse link direction, the method may further comprise receiving a request-to-send message from the selected remote station, transmitting a clear-to-send message to the selected remote station, receiving a data frame from the selected remote station, and transmitting an acknowledgement message to the selected remote station.

Creating the antenna database may be performed in at least three ways. One approach is to use control frames in a forward link, a second approach is to use control frames in a reverse link, and a third approach is to use probe signals.

Creating the antenna database using control frames in a forward link comprises the access point communicating with the plurality of remote stations in the forward link based upon an exchange of packet data comprising a plurality of control frames and a data frame, and creating the antenna database comprises the following: receiving a solicited first control frame via a first antenna pattern of the directional antenna from a first remote station, transmitting a first data frame to the first remote station, receiving a second control frame via a second antenna pattern of the directional antenna from the first remote station, measuring a signal quality of the first control frame received via the first antenna pattern and a signal quality of the second control frame received via the second antenna pattern. These steps are repeated for any remaining antenna patterns.

In addition, the method further comprises repeating the receiving and transmitting for measuring a signal quality of the first control frame received via the first antenna pattern and a signal quality of the second control frame received via the second antenna pattern for each remote station. The first control frame received comprises a clear-to-send message, and the second control frame received comprises an acknowledgement message.

Creating the antenna database using control frames in a reverse link comprises the access point receiving a first control frame via a first antenna pattern of the directional antenna from a first remote station, transmitting a second control frame to the first remote station, receiving a first data frame via a second antenna pattern of the directional antenna from the first remote station, and measuring a signal quality of the first control frame received via the first antenna pattern and a signal quality of the first data frame received via the second antenna pattern. These steps are repeated for any remaining antenna patterns.

The method further comprises repeating the receiving and transmitting for measuring a signal quality of the first control frame received via the first antenna pattern and a signal quality of the first data frame received via the second antenna pattern for each remote station. The first control frame received comprises a request-to-send message, and the second control frame transmitted comprises a clear-to-send message.

Creating the antenna database using probe signals is based upon the directional antenna comprising an omni angle and a plurality of directional angles, and creating the antenna database comprises selecting a first remote station, transmitting a first probe signal via the omni angle of the directional antenna to the first remote station, and measuring a first probe response signal received via the omni angle from the first remote station responding to the first probe signal. A respective second probe signal is transmitted via each one of the plurality of directional angles of the directional antenna to the first remote station, and a second probe response signal received via each directional angle from the first remote station responding to the respective second probe signal is measured.

When using the probe signals, the method further comprises selecting a next remote station from the plurality of remote stations, repeating the transmitting of the first and second probe signals to the next selected remote station, and the measuring of the first and second probe response signals received from the next selected remote station. These steps are repeated for each of the remaining remote stations from the plurality of remote stations. The first probe signal comprises a request-to-send (RTS) message and the first probe response signal comprises a clear-to-send (CTS) message, and the second probe signal comprises an RTS message and the second probe response signal comprises a CTS message.

The access point is operating based upon at least one of an IEEE 802.11 standard and an IEEE 802.16 standard. The directional antenna comprises at least one active element and a plurality of passive elements.

Another aspect of the present invention is directed to an access point for a wireless local area network (WLAN) comprising a directional antenna comprising a plurality of antenna patterns, and a controller connected to the directional antenna for control thereof. The controller communicates with a plurality of remote stations by creating an antenna database by associating with each remote station a respective measured signal quality corresponding to the plurality of antenna patterns. The respective measured signal qualities are determined based upon communications with each remote station.

The controller determines for each remote station a preferred antenna pattern based upon the antenna database, and selects a remote station and the corresponding preferred antenna pattern to communicate with. Based upon the antenna database and prior to communicating with the selected remote station, it is determined that any non-selected remote stations have the potential of not being aware when such communications actually occurs.

BRIEF DESCRIPTION OF THE DRAWINGS

The foregoing and other objects, features and advantages of the invention will be apparent from the following more particular description of preferred embodiments of the invention, as illustrated in the accompanying drawings. The drawings are not necessarily to scale, with emphasis instead being placed on illustrating the principles of the invention.

DETAILED DESCRIPTION OF THE PREFERRED EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1A:
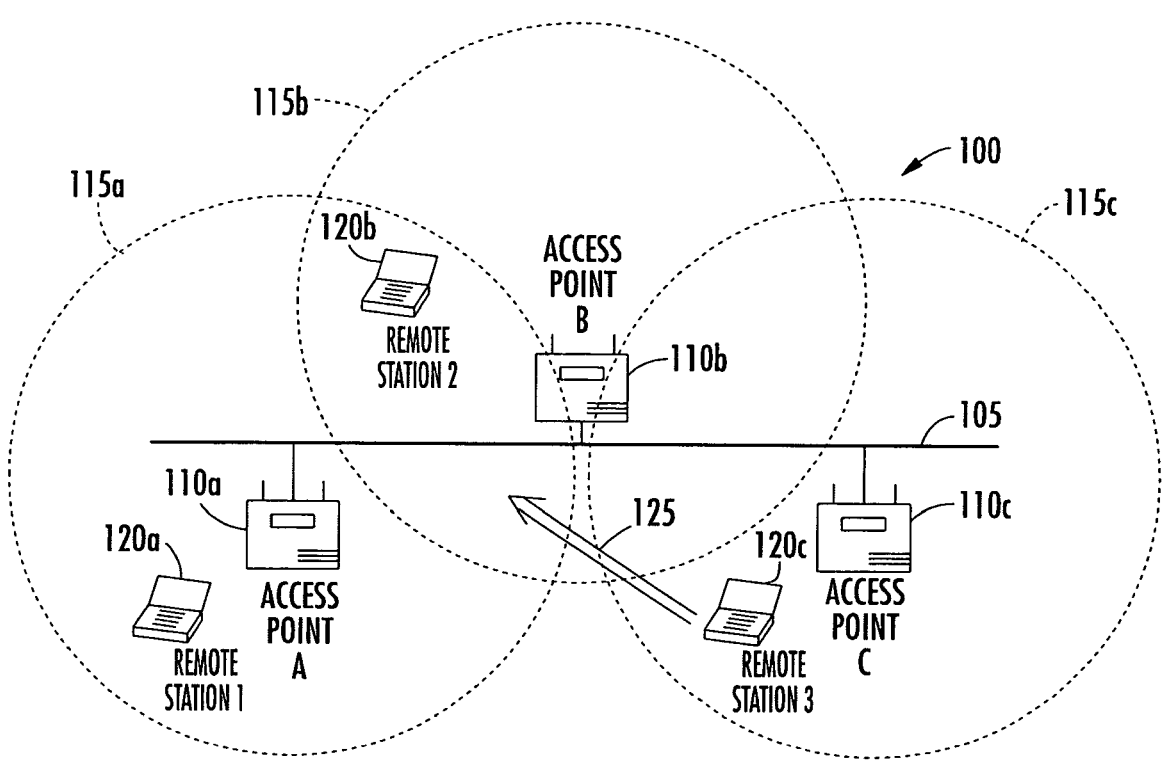
FIG. 1A is a schematic diagram of a wireless local area network (WLAN) employing the principles of the present invention.

Referring initially to FIG. 1A, a wireless local area network (WLAN) 100 having a distribution system 105 will initially be discussed. Access points 110a, 110b and 110c are connected to the distribution system 105 via wired connections, such as wired data network connections. Each of the access points 110a, 110b and 110c has a respective zone 115a, 115b, 115c in which it is capable of communicating via radio frequency (RF) signals with the remote stations 120a, 120b, 120c. The remote stations 120a, 120b, 120c are supported with wireless local area network hardware and software to access the distribution system 105. In the following description, when a general reference is made to the access points, the remote stations and the zones, the respective reference numerals 110, 120 and 115 may be used.

Present technology provides the access points 110 and the remote stations 120 with antenna diversity. Antenna diversity allows the access points 110 and the remote stations 120 to select one of two antennas to provide transmit and receive duties based on the quality of signals being received. One reason for selecting one antenna over the other occurs in the event of multi-path fading, in which a signal taking two different paths causes signal cancellation to occur at one antenna but not the other. Another example is when interference is caused by two different signals received at the same antenna. Yet another reason for selecting one of the two antennas is due to a changing environment, such as when a remote station 120c is carried from the third zone 115c to the first or second zones 115a, 115b as indicated by arrow 125.

Figure 1B:
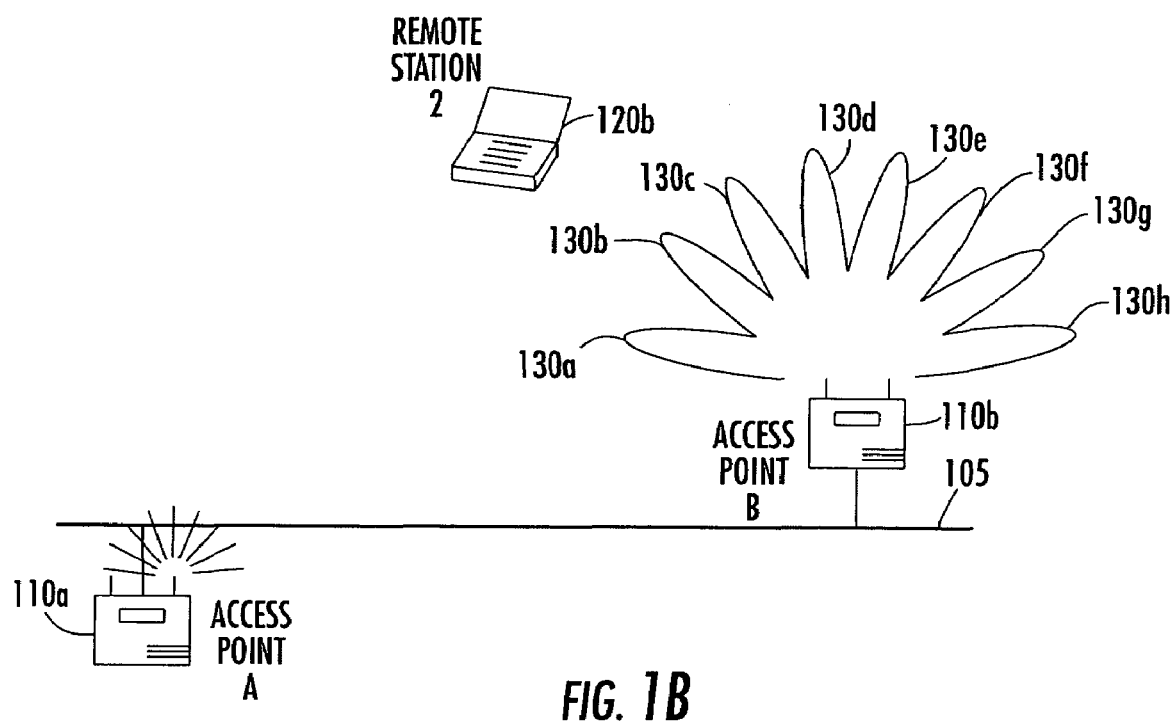
FIG. 1B is a schematic diagram of an access point in the WLAN of FIG. 1A performing an antenna scan.

FIG. 1B is a block diagram of a subset of the network 100 illustrated in FIG. 1A in which an access point 110b, employing the principles of the present invention, is shown in greater detail with respect to the directive antenna lobes 130a–130i. The directive antenna lobes 130a–130i will also be generally indicated by reference numeral 130. The access point 110b sequences through the antenna lobes 130 during a scan of its environment to determine a preferred antenna direction.

Figure 2A:
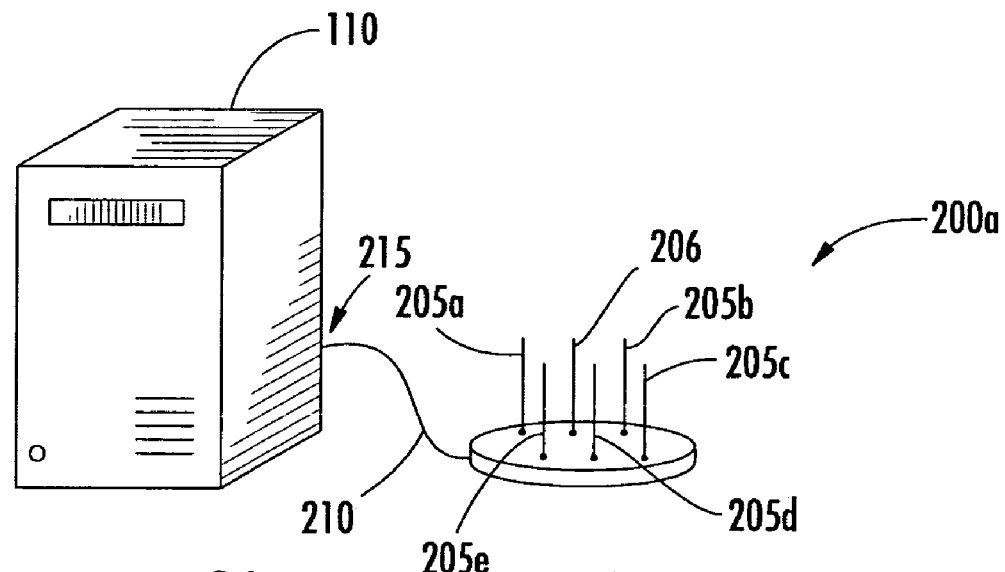
FIG. 2A is a view of an access point of FIG. 1A having an external directive antenna array.
Figure 2B:
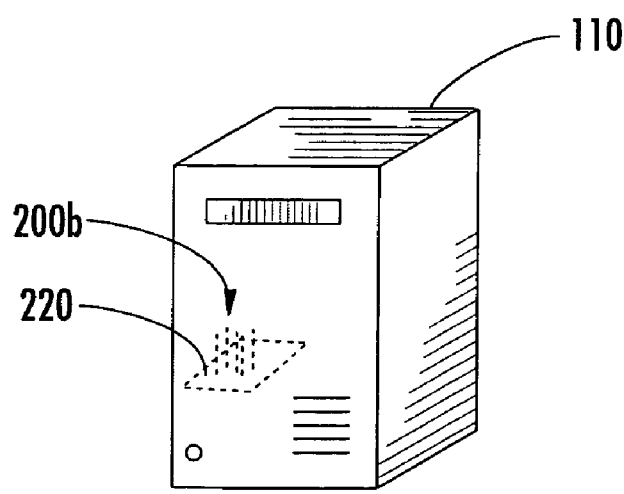
FIG. 2B is a view of the access point of FIG. 2A having the directive antenna array incorporated in an internal PCM-CIA card.

During a scan, the access point 110b uses a directive antenna, as shown in greater detail in FIGS. 2A and 2B, to scan in search of RF signals transmitted by the remote station 120b. At each scan direction (i.e., angle or antenna pattern), the access point 110b measures a signal or probe response and calculates a respective metric for that scan angle. Examples of the metrics include a received signal strength indication (RSSI), a carrier-to-interference ratio (C/I), an energy-per-bit ratio (Eb/No), or other suitable measures, such as a signal-to-noise ratio (SNR), of the quality of the received signal or signal environment. A combination of these measurements may also be made to determine the best or preferred antenna pattern, as readily appreciated by those skilled in the art. Based on the measured signal quality metrics, the access point 110b determines the preferred antenna angle or direction for communicating with the remote station 120b.

The scans may occur before or after the remote station 110b has been authenticated and has associated with the distribution system 105. Thus, the initial antenna scan may be accomplished within the MAC layer. Alternatively, the initial scan may be accomplished external from the MAC layer. Similarly, scans occurring after the remote station 110b has authenticated and has associated with the distribution system 105 may be accomplished within the MAC layer or by processes occurring external the MAC layer.

FIG. 2A is a diagram of an access point 110 using an external directive antenna array 200a. The directive antenna array 200a includes five monopole passive antenna elements 205a, 205b, 205c, 205d and 205e and one monopole, active antenna element 206. The passive antenna elements 205a, 205b, 205c, 205d and 205e are generally referred to below by reference numeral 205. The directive antenna element 200a is connected to the access point 110 via a universal serial bus (USB) port 215. Other types of connections between the directive antenna array 200a and the access point 110 are readily acceptable.

The passive antenna elements 205 in the directive antenna array 200a are parasitically coupled to the active antenna element 206 to permit scanning. By scanning, it is meant that at least one antenna beam of the directive antenna array 200a can be rotated, optionally 360 degrees, in increments associated with the number of passive antenna elements 205.

A detailed discussion of the directive antenna array 200a is provided in U.S. Patent Publication No. 2002/0008672, published Jan. 24, 2002, entitled "Adaptive Antenna For Use In Wireless Communications System", the entire disclosure of which is incorporated herein by reference and which is assigned to the current assignee of the present invention. Example methods for optimizing antenna direction based on received or transmitted signals by the directive antenna array 200a are also discussed therein.

The directive antenna array 200a may also be used in an omni-directional mode to provide an omni-directional antenna pattern. The access points 110 may use an omnidirectional pattern for transmission or reception. The access points 110 may also use the selected directional antenna when transmitting to and receiving from the remote stations 120.

FIG. 2B is an isometric view of an access point 110 with an internal directive antenna 220b. In this embodiment, the directive antenna array 200b is on a PCMCIA card 220. The PCMCIA card 220 is carried by the access point 110 and is connected to a processor (not shown). The directive antenna array 200b provides the same functionality as the directive antenna array 200a illustrated in FIG. 2A.

It should be understood that various other forms of directive antenna arrays can be used. Examples include the arrays described in U.S. Pat. No. 6,515,635 issued Feb. 4, 2003, entitled "Adaptive Antenna For Use In Wireless Communication Systems" and U.S. Patent Publication No. 2002/0036586, published Mar. 28, 2002, entitled "Adaptive Antenna For Use In Wireless Communication System," the entire teachings of which are incorporated herein by reference and which are assigned to the current assignee of the present invention.

Figure 3A:
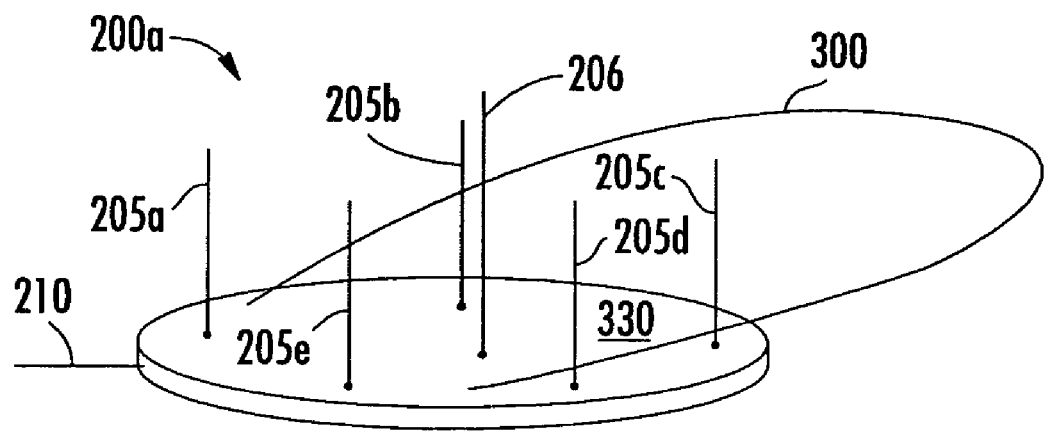
FIG. 3A is a view of the directive antenna array of FIG. 2A.

FIG. 3A is a detailed view of the directive antenna array 200a that includes the passive antenna elements 205 and the active antenna element 206 as discussed above. The directive antenna array 200a also includes a ground plane 330 to which the passive antenna elements are electrically coupled, as discussed below in reference to FIG. 3B.

Still referring to FIG. 3A, the directive antenna array 200a provides a directive antenna lobe 300 angled away from antenna elements 205a and 205e. This is an indication that the antenna elements 205a and 205e are in a reflective mode, and the antenna elements 205b, 205c and 205d are in a transmission mode. In other words, the mutual coupling between the active antenna element 206 and the passive antenna elements 205 allows the directive antenna array 200a to scan the directive antenna lobe 300, which, in this case, is directed as shown as a result of the modes in which the passive elements 205 are set. Different mode combinations of passive antenna element 205 result in different antenna lobe 300 patterns and angles, as readily understood by those skilled in the art.

Figure 3B:
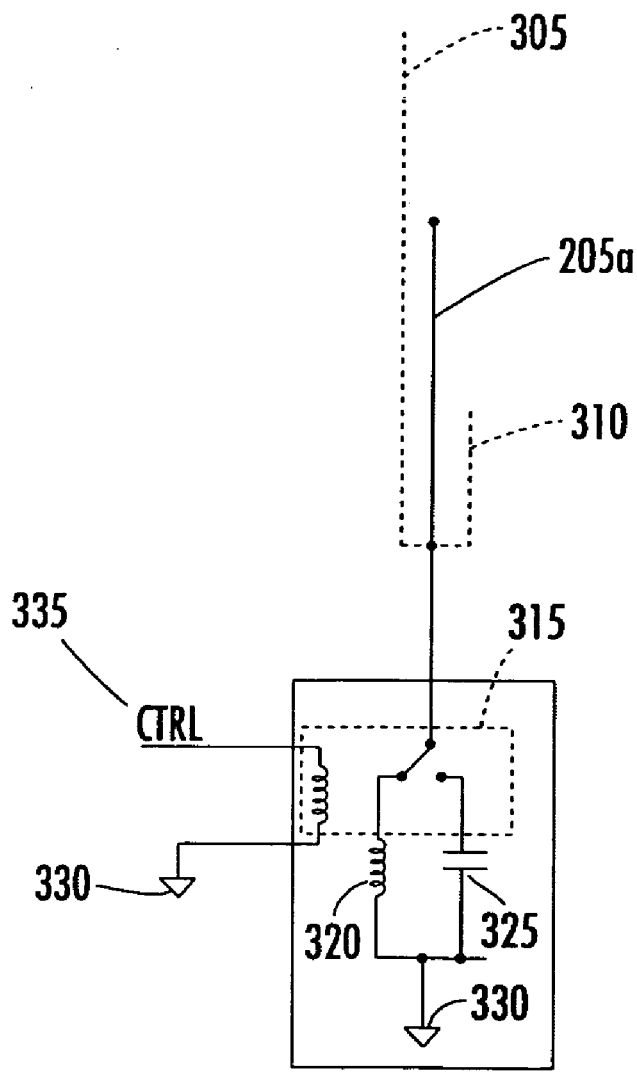
FIG. 3B is a schematic diagram of a switch used to select a state of an antenna element of the directive antenna of FIG. 3A.

FIG. 3B is a schematic diagram of an example circuit that can be used to set the passive antenna elements 205 in the reflective or transmission modes. The reflective mode is indicated by a representative elongated dashed line 305, and the transmission mode is indicated by a shortened dashed line 310. The representative modes 305 and 310 are respectively caused by coupling to a ground plane 330 via an inductive element 320 or a capacitive element 325. The coupling of the passive antenna element 205a through the inductive element 320 or capacitive element 325 is performed via a switch 315. The switch 315 may be a mechanical or electrical switch capable of coupling the passive antenna element 205a to the ground plane 330. The switch 315 is set via a control signal 335.

Coupled to the ground plane 330 via the inductor 320 is the passive antenna element 205a, which is effectively elongated as shown by the longer representative dashed line 305. This can be viewed as providing a "backboard" for an RF signal coupled to the passive antenna element 205a via mutual coupling with the active antenna element 206. In the case of FIG. 3A, both passive antenna elements 205a and 205e are connected to the ground plane 330 via respective inductive elements 320. At the same time, in the example of FIG. 3A, the other passive antenna elements 205b, 205c and 205d are electrically connected to the ground plane 330 via respective capacitive elements 325.

The capacitive coupling effectively shortens the passive antenna elements as represented by the shorter representative dashed line 310. Capacitively coupling all of the passive elements 325 effectively makes the directive antenna array 200a an omni-directional antenna. It should be understood that alternative coupling techniques may also be used between the passive antenna elements 205 and the ground plane 330, such as delay lines and lumped impedances, for example.

Figure 9:
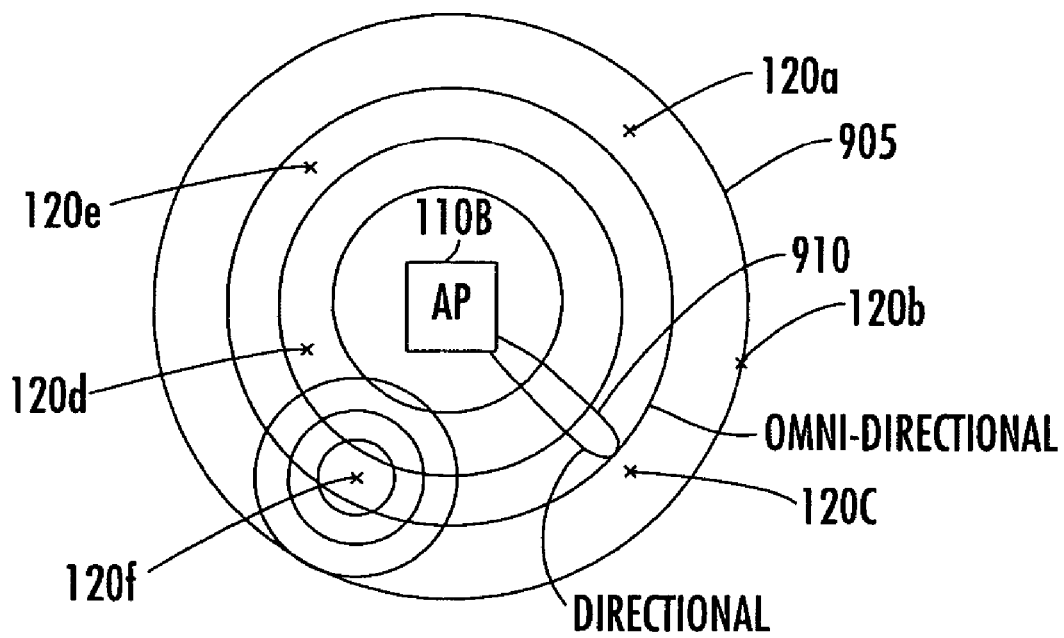
FIG. 9 is a top view of the network of FIG. 1 with indications of the antenna beams.

Jumping to FIG. 9, an overhead view of the access point 110b generating an omni-directional antenna pattern 905 and a directional antenna pattern 910 through use of the directive antenna array 200a or 200b is provided. The access point 110b communicates with multiple stations 120a–120d. Since access points 110 are usually remotely installed without nearby obstructions or moving reflectors (e.g., high on a wall or ceiling), the selection of the preferred antenna pattern direction is likely not going to change throughout the connection with a given remote station 120.

The illustrated access point 110b may make use of a directional antenna 200a for downlink data frames transmitted to a selected remote station 120c. For most broadcast and control frames, the access point may use the omnidirectional antenna pattern 905 and the lowest available data rate to ensure that all remote stations 120 receive them. The directional antenna 200a may not increase the coverage area of the network 100, but may increase the data rate for data frames sent to the remote stations 120. The increased downlink rate is useful because the majority of the data transferred over the network 100 appears on the downlink (e.g., web page access, file transfers). One option is to use switched spatial diversity when the access point 110b is required to receive in the omni mode. The potential added link margin of 5 dB accommodates a throughput increase of 300%, for example.

Uplink data frames sent from the selected remote station 120c to the access point 110b during contention periods (CP) are received using the omni-directional antenna pattern since any remote station may have transmitted the frame. For large frames, the network configuration may require the remote station to use the request-to-send/clear-to-send (RTS/CTS) mechanism to reserve the wireless medium. In this case, the access point 110b could receive in a directional mode to increase the data rate on the uplink. This is somewhat dependent on the data rate selection algorithm implemented at the remote station 120c.

In downlink transmissions, the access point 110b may decide to transmit small packets during contention periods using the omni-directional pattern and a lower data rate. The reason for this is that a remote station on the "other" side of the coverage area (such as remote station 120e) may not hear the access point transmission from the directional antenna pattern 910 pointed away from it. This is the familiar "hidden node" problem where two remote stations 120 do not hear each other and end up transmitting at the same time. In this case the two remote stations are 120c and 120e. A method to avoid this problem, especially for large data frames, is described below in reference to FIG. 7.

The directional antenna patterns at the access point 110 can thus provide higher data rates for downlink and uplink data frame exchanges with the remote stations 120, which is the bulk of the network traffic. Network connectivity is maintained with the nominal gain of the omni-directional antenna of the access point 110. That is, the remote stations 120 can associate with the access point 110 and maintain the connection without the use of the directional antenna 200a.

A set of rules as provided in TABLE 1 can be defined to take advantage of the omni-directional and directional characteristics of the directional antenna 200a. TABLE 1 includes addresses of the remote stations 120 currently associated with the access point 110 and their current antenna direction selection. TABLE 1 may delineate example antenna direction selections based on frame sequences from the 802.11 standard (TABLES 21 and 22 therein). In TABLE 1, "Dir" indicates direction, "UL" indicates uplink, and "DL" indicates downlink.

TABLE 1

Example Antenna Selection Rules

Figure 5A:
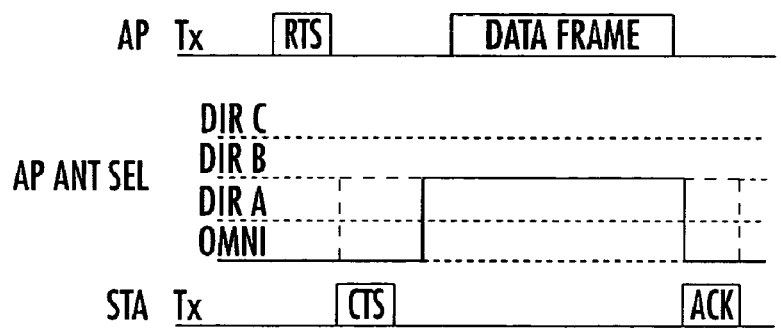
FIG. 5A is a signal diagram optionally used by the antenna steering process of FIG. 4.
Figure 5B:
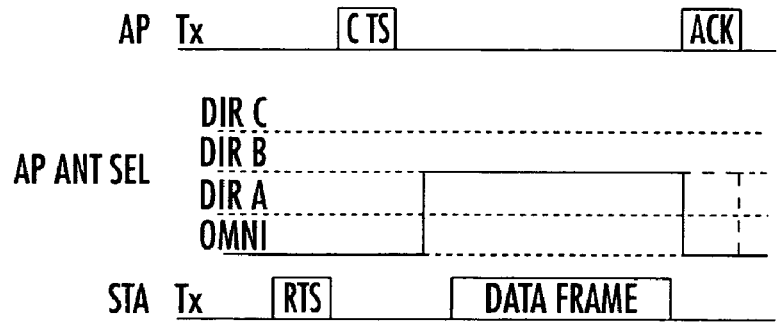
FIG. 5B is an alternative signal diagram optionally used by the antenna steering process of FIG. 4.

| Sequence | Dir | Antenna Selection | |
|---|---|---|---|
| Beacon | DL | Omni | |
| Data | DL | Dir | See FIG. 5A |
| RTS-CTS-Data | UL | Omni/Dir | See FIG. 5B |

A process can be described in a set of rules that determine when to select the omni-directional pattern and when to select a directional pattern. For example, the access point 110 may select a directional pattern during time intervals when transmitting or receiving to/from a single remote station 120.

Figure 4:
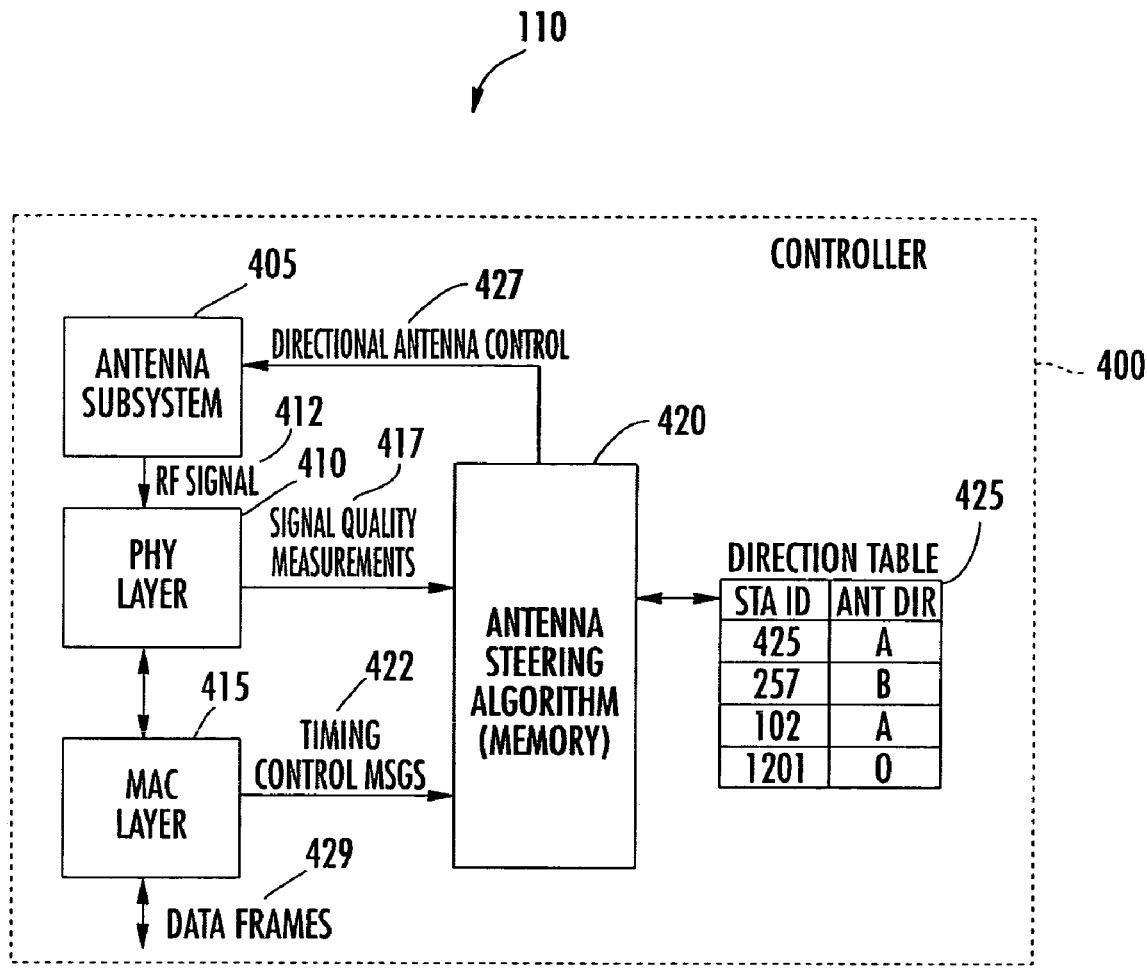
FIG. 4 is a block diagram of an access point of FIG. 1A employing subsystems, layers and an antenna steering process according to the principles of the present invention.

A block diagram showing the interfaces of the access point 110 is shown in FIG. 4. The illustrated access point 110 includes various subsystems and layers. An antenna subsystem 405 may include the directional antenna 200b and supporting circuitry, buses and software to operate the directional antenna. The antenna subsystem 405 interfaces to the physical layer 410 and provides RF signals 412 thereto.

The physical layer 410 processes the RF signals 412 and determines signal quality measurements 417 to an antenna steering process 420. The physical layer 410 sends processed signals based upon the RF signals 412 to the MAC layer 415. The MAC layer 415 generates timing control messages 422, which are also sent to the antenna steering process 420 in order to switch the antenna to the omni mode or directional mode when required.

The MAC layer 415 also sends data frames 429 to other processes (not shown). The illustrated physical layer 410, MAC layer 415 and antenna steering process 420 may reside within a controller 400. The antenna steering process 420 may be stored within a memory, for example, which may be a stand-alone memory or an embedded memory within a processor, for example.

The antenna steering process 420 maintains an "antenna table or database" or a "direction table or database" 425 as a function of the received signal quality measurements 417 made during antenna scans of each remote station 120. For example, the direction table 425 may store a station ID and a corresponding antenna direction (A, B, C) for directional communications with the remote stations 120. Once the antenna directions in the direction table 425 have been determined, the antenna steering process 420 is used to provide directional antenna control 427 to the antenna subsystem 405. If the signal quality measurements 417 are above a predetermined threshold indicating that the highest data rate can be supported in the omni-directional mode, the antenna direction may be held at the omni-directional (O) mode.

The following paragraphs describe various techniques in accordance with the present invention for determining the preferred direction to point a directional antenna 220b from an access point 110 to a remote station 120. The first technique employs a spatial diversity selection mechanism. The second technique uses a sequence of probe signals exchanged between the access point 110 and the remote stations 120. The third technique uses control messages (e.g., ACK or CTS) to make signal quality measurements of the received antenna directions at the access point 110. The third technique is applicable in both forward and reverse direction links.

The first technique assumes that current 802.11 devices incorporate antenna switched diversity scan/control and that future 802.11 devices, such as 802.11a/802.11g/802.11n will also support switched diversity. The first technique is applicable after a remote station 120 has authenticated and associated itself with a network. It is assumed that the initial antenna scan is accomplished within the MAC/network layer protocol. With a directional or multi-element antenna 220a, the first technique can make use of the diversity protocol to keep the antenna position/selection updated.

Figure 6:
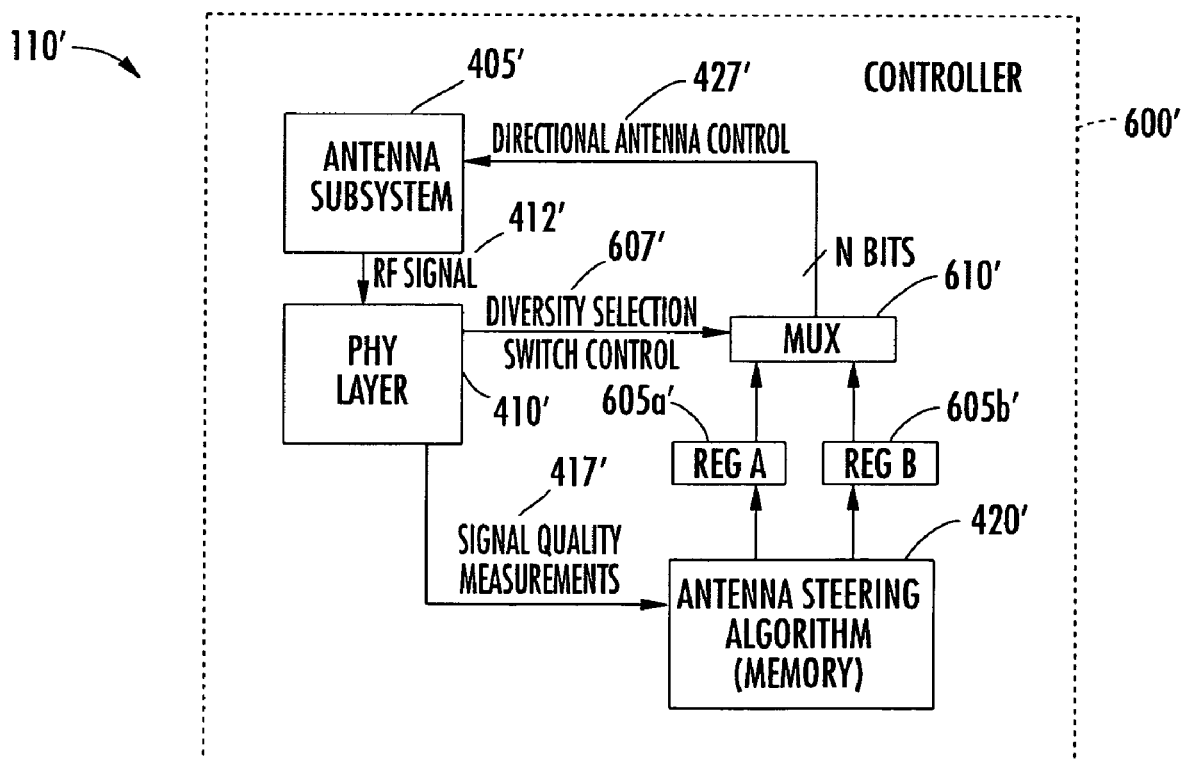
FIG. 6 is an alternative block diagram of FIG. 4 in which antenna diversity circuits are employed.

Referring now to FIG. 6, the first technique functions as follows. The illustrated access point 110' includes a controller 600' connected to the antenna subsystem 405'. The controller 600' comprises a physical layer 410', which is given access to the antenna control signals, and a MAC layer (FIG. 4). The MAC layer writes antenna selections into register A 605a' and register B 605b'. Register A 605a' contains the selected antenna position, and register B 605*b*' contains a candidate antenna position. The physical layer 410' is also in communications with a multiplexer 610'. The physical layer 410' sends a diversity selection switch control signal 607' to the multiplexer 610' in a typical diversity selection control manner, but in this case, the diversity selection switch control signal controls whether the contents of register A 605*a*' or register B 605*b*' are used.

The selected antenna position is initially chosen during the network authentication/association protocol. The candidate antenna position is any other antenna position (including an omni-directional mode). The candidate antenna position is changed, in a predetermined sequence, after a valid packet has been received or after not receiving any packets for a predetermined time period.

After successfully receiving a packet, the physical layer 410' sends received signal quality metrics (signal strength, signal-to-noise ratio, multi-path/equalizer metrics, etc.) for both antenna positions to the MAC layer. During the packet reception, the physical layer 410' functions as it does now for 802.11; that is, to switch between the two antenna positions and to use the best antenna position for packet reception. After valid packet reception by the physical layer 410', the signal quality metrics for the two antenna positions are sent to the MAC layer. The MAC layer updates both the selected antenna position and the candidate antenna position. The selected antenna position is replaced with the best position based on the data received from the physical layer 410'. Filtering/hysteresis may be used to keep from "ping-ponging" between two antenna positions.

As stated previously, this technique takes advantage of the current 802.11 antenna switched diversity methods. It should be understood that this first technique may include hardware, software/firmware or combinations thereof.

Figure 10:
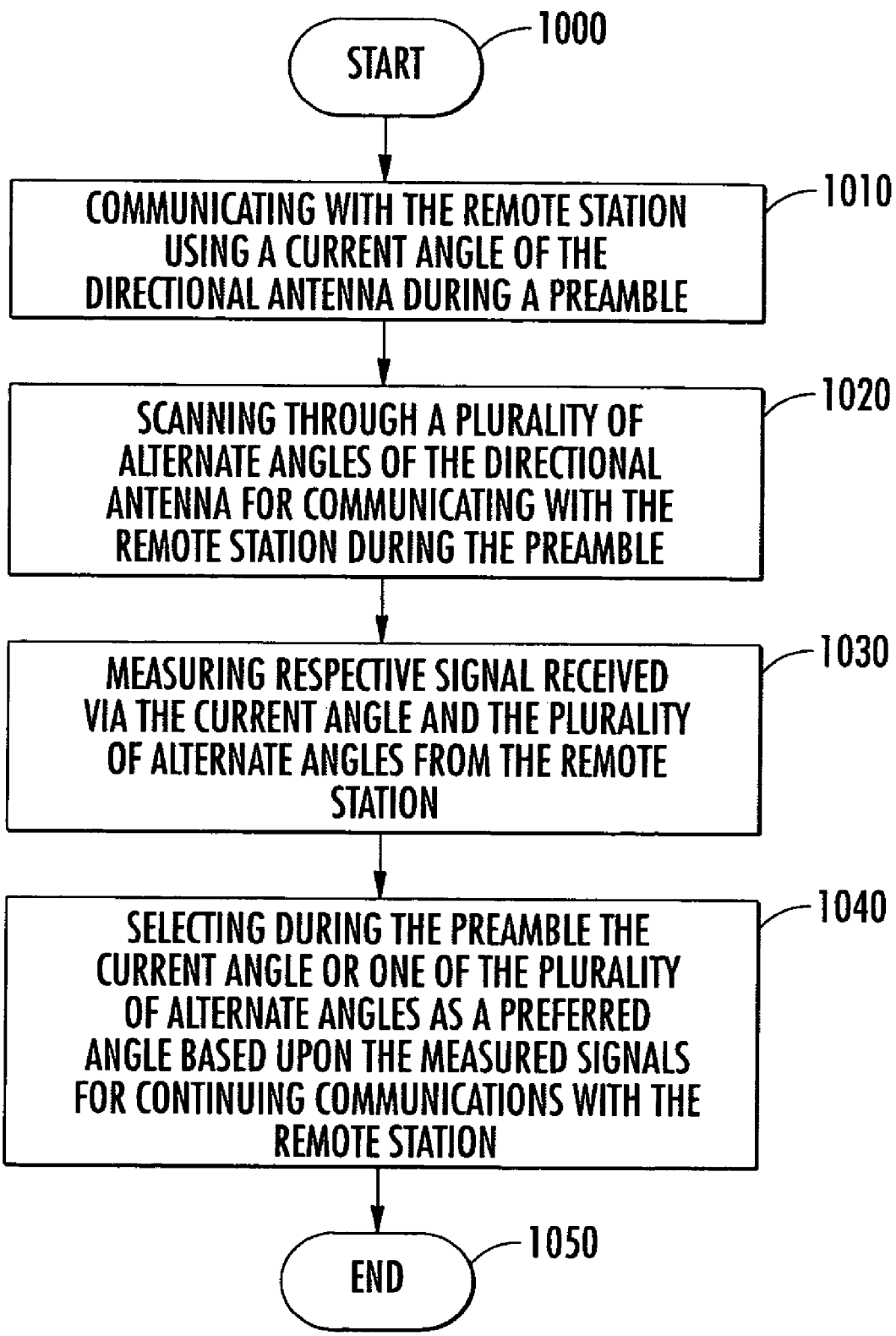
FIG. 10 is a flowchart of a method for operating an access point in a WLAN based upon spatial diversity in accordance with the present invention.

Referring now to FIG. 10, a flowchart of the above described method for operating an access point 110 in a WLAN 100 based upon spatial diversity will be discussed. From the start (Block 1000), the method comprises communicating with the remote station 120 using a current angle of the directional antenna 220*b* at Block 1010. Scanning through a plurality of alternate angles of the directional antenna 220*b* for communicating with the remote station 120 during the preamble is performed at Block 1020. Respective signals received via the current angle and the plurality of alternate angles from the remote station 120 are measured at Block 1030. During the preamble, the current angle or one of the plurality of alternate angles is selected at Block 1040 as a preferred angle based upon the measured signals for continuing communications with the remote station 120. The method ends at Block 105.

The second technique is based upon the transmission by the access point 110 of RTS messages to the remote stations 120, and the reception of CTS messages transmitted in response by the remote stations to the access point. The 802.11 standard also defines a probe request/probe response exchange, which is typically used by remote stations 120 to determine the quality of the link to other stations 120.

Figure 8:
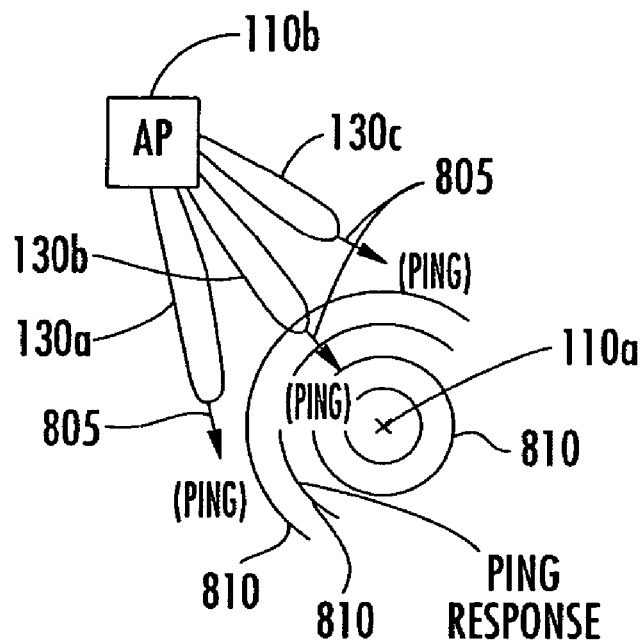
FIG. 8 is a top view of the network of FIG. 1 with bi-directional signaling.

When used by the access point 110 to determine the preferred pointing direction to a selected remote station 120, as illustrated in FIG. 8, the access point 110 transmits a probe request signal 805 in the omni pattern and each of the potential directional patterns 130, and measures the signal quality of the probe response signal 810 sent back from the remote station 110 while operating in the respective patterns.

Measurements of these response frames 810 make this a more reliable technique than the diversity selection technique described above. This second technique is preferably employed at least once immediately after a remote station 120 has associated with the access point 110. However, there is an impact to network efficiency using additional probe request/probe response signals, but these exchanges may be infrequent.

Figure 11:
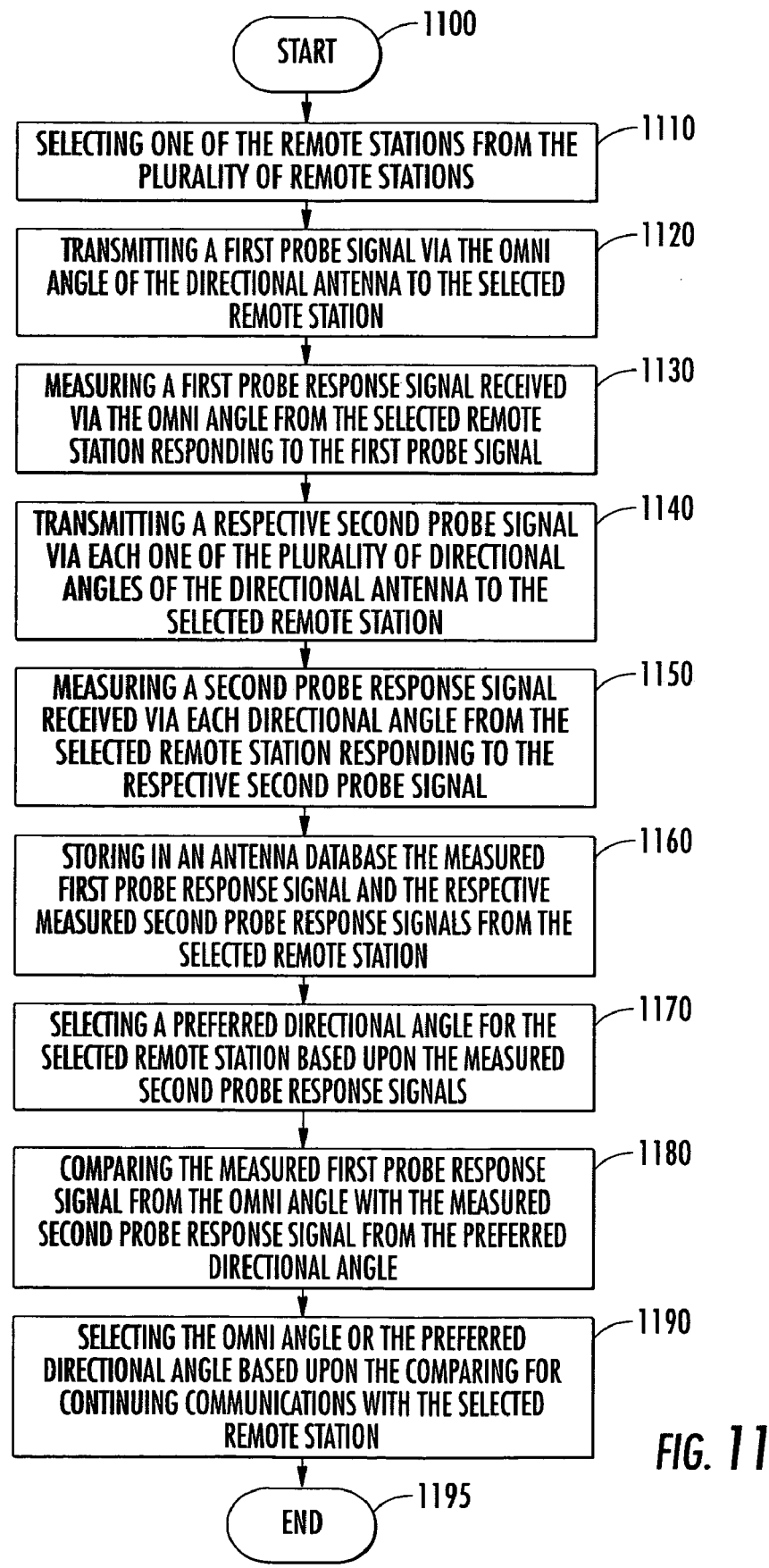
FIG. 11 is a flowchart of a method for operating an access point in a WLAN based upon probe signals in accordance with the present invention.

Referring now to FIG. 11, a flowchart of the above described method for operating an access point 110 in a WLAN 100 based upon probe signals will be discussed. From the start (Block 1100), the method comprises selecting a remote station 120 at Block 1110, transmitting a first probe signal via the omni angle of the directional antenna 220*b* to the selected remote station at Block 1120, and measuring a first probe response signal received via the omni angle from the selected remote station responding to the first probe signal at Block 1130.

A respective second probe signal is transmitted at Block 1140 via each one of the plurality of directional angles of the directional antenna 220*b* to the selected remote station 120, and a second probe response signal received via each directional angle from the selected remote station responding to the respective second probe signal is measured at Block 1150. The measured first probe response signal and the respective measured second probe response signals from the selected remote station 120 are stored in an antenna database at Block 1160.

A preferred directional angle for the selected remote station 120 is selected at Block 1170 based upon the measured second probe response signals. The measured first probe response signal from the omni angle is compared at Block 1180 with the measured second probe response signal from the preferred directional angle. The first probe signal comprises a request-to-send (RTS) message and the first probe response signal comprises a clear-to-send (CTS) message. Similarly, the second probe signal comprises an RTS message and the second probe response signal comprises a CTS message. The omni angle or the preferred directional angle is selected at Block 1190 based upon the comparing for continuing communications with the selected remote station 120. The method ends at Block 1195.

The third technique exploits the control frames used in normal data exchanges between the access point 110 and the remote stations 120. This technique may be used in both forward link communications and reverse link communications. Since the clear-to-send (CTS) and acknowledge (ACK) messages are sent at the lower data rates, the access point 110 can use these messages to compare the omni pattern 905 to the currently selected directional pattern 130. This is illustrated in FIG. 5A with the dashed lines on the antenna selection timing. This can serve as a method to determine whether the currently selected direction 130 has maintained its advantage over the omni-directional pattern 905. This advantage is typically based upon a predetermined threshold to prevent frequent switching between two antenna patterns having similar signal quality metrics.

For example, during the CTS messages, the omni-directional mode may be used to receive this message to calculate a first signal quality measurement. During the ACK message, a test antenna direction may be used to receive this message to calculate a second signal quality measurement. Comparison of the first and second signal quality measurements is performed and a determination is made as to whether the test antenna direction should be stored. That is, whether the directional mode provides a higher gain than omni-directional mode. Comparisons may also be performed between two different directional antenna directions.

The same types of measurements and comparisons may be conducted during a reverse link data transmission, as shown in FIG. 5B. During the ACK message, the access point 110 may calculate a signal quality measurement and compare it to an omni-directional mode measurement or other directional mode measurement. Comparisons may be conducted over several communications with the selected remote station 110 before scanning a different antenna direction.

The direction table 425 in FIG. 4 may be augmented with signal quality measurements from the process or processes described above for the omni and selected directional antenna pattern. If the advantage drops below a predetermined threshold, the access point 110 reverts back to the omni selection and performs an antenna search using one of the first two techniques described above.

In cases where the remote station 120 goes into a power-save mode or has long idle periods with no data transfers, the access point 110 reverts back to the omni pattern selection. When the remote station 120 becomes active again, the access point 110 may perform another antenna search.

Figure 12:
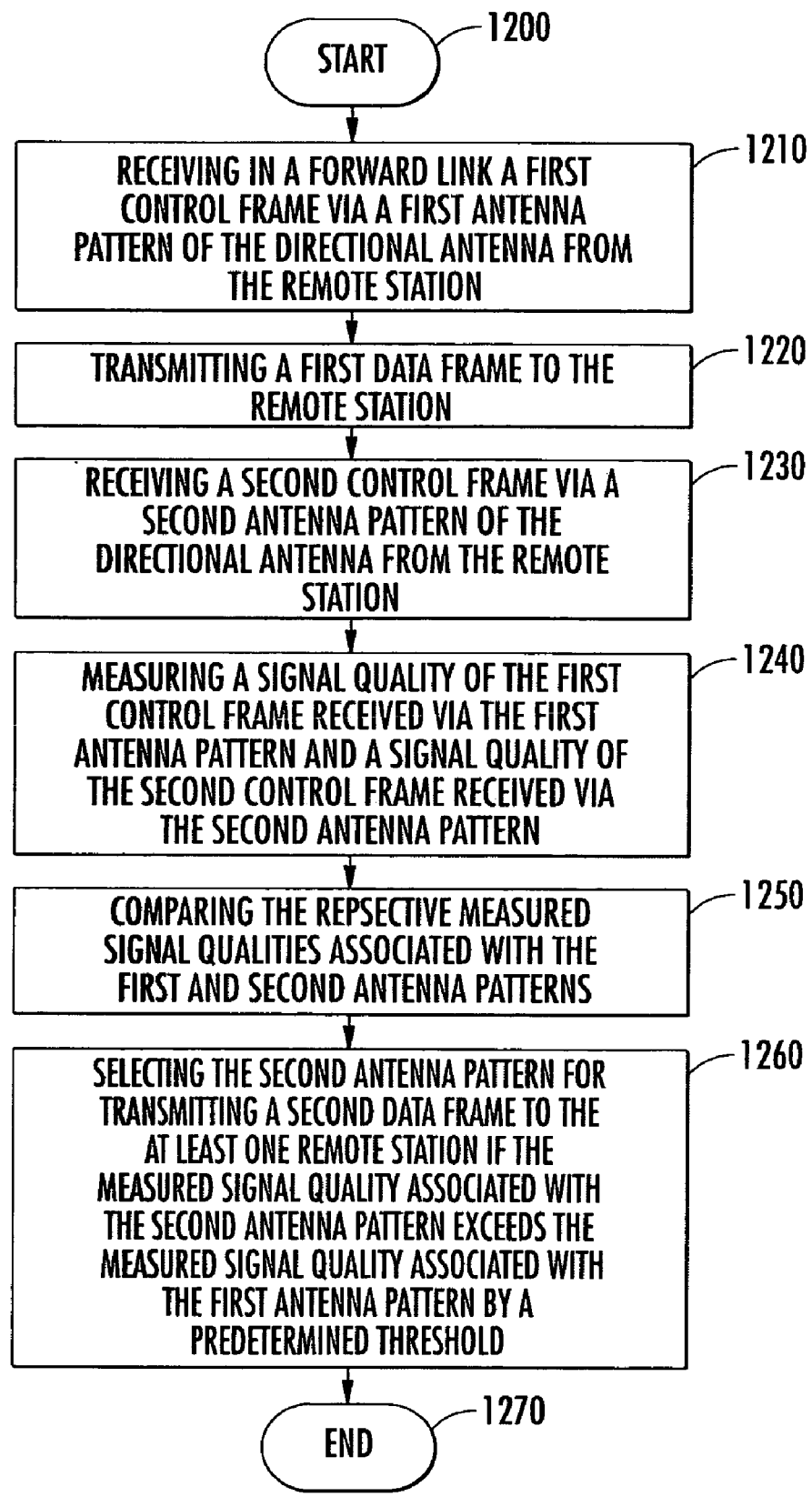
FIGS. 12 and 13 are respective flowcharts of a method for operating an access point in a WLAN based upon control frames in forward and reverse links in accordance with the present invention.
Figure 13:
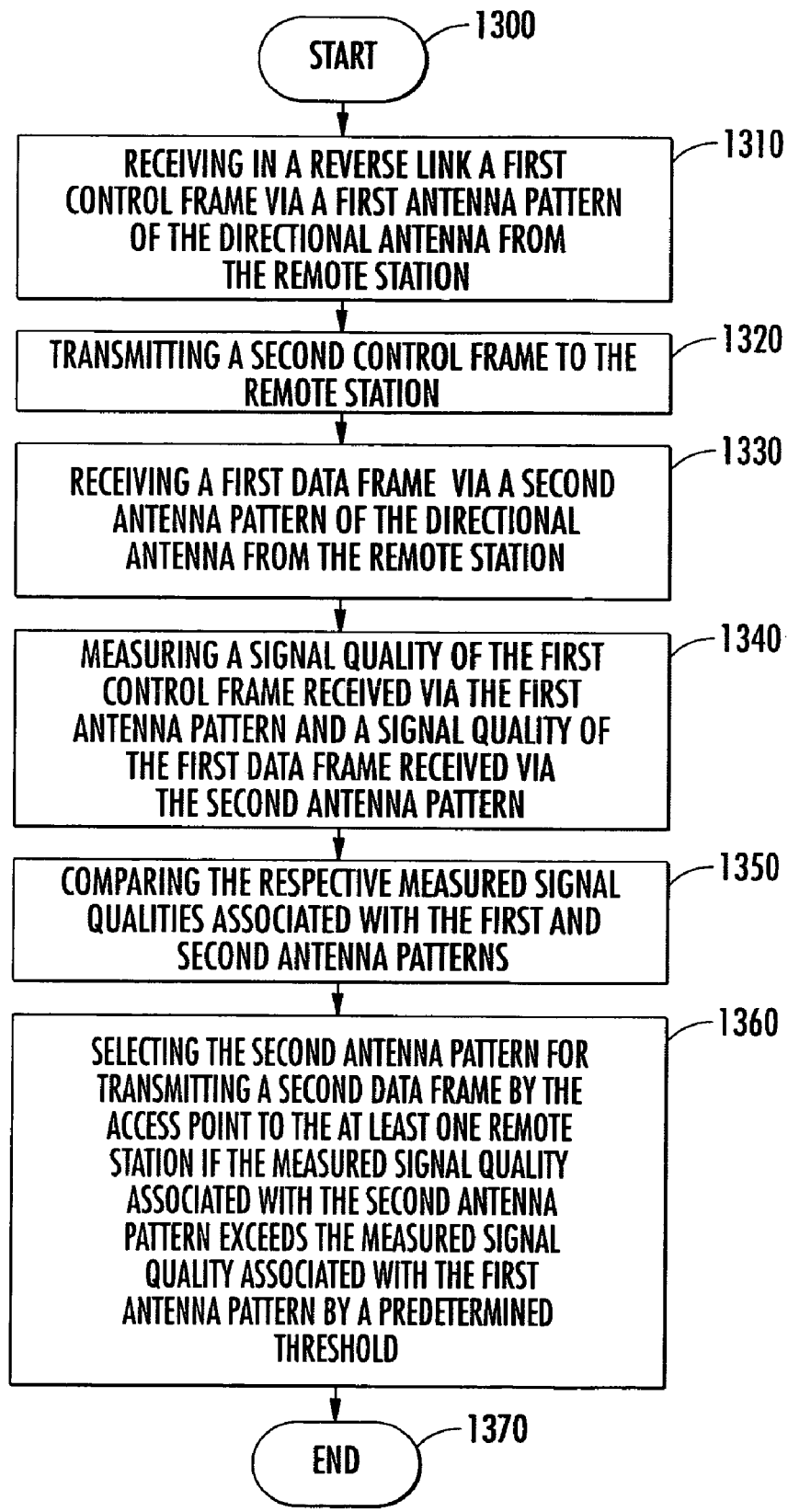

Referring now to FIGS. 12 and 13, respective flowcharts of a method for operating an access point 120 in a WLAN 100 based upon control frames in forward and reverse links will be discussed. From the start (Block 1200), the method comprises receiving in the forward link a first control frame via a first antenna pattern of the directional antenna 220b from the remote station 120 at Block 1210, and transmitting a first data frame to the remote station at Block 1220, and receiving a second control frame via a second antenna pattern of the directional antenna from the remote station at Block 1230. A signal quality of the first control frame received via the first antenna pattern and a signal quality of the second control frame received via the second antenna pattern are measured at Block 1240. The respective measured signal qualities associated with the first and second antenna patterns are compared at Block 1250. The second antenna pattern for transmitting a second data frame to the remote station 120 is selected at Block 1260 if the measured signal quality associated with the second antenna pattern exceeds the measured signal quality associated with the first antenna pattern by a predetermined threshold. The first control frame received comprises a clear-to-send message, and the second control frame received comprises an acknowledgement message. The method ends at Block 1270.

The method for operating an access point 120 in a WLAN 100 based upon control frames in the reverse link comprises from the start (Block 1300), receiving a first control frame via a first antenna pattern of the directional antenna 220b from the remote station at Block 1310, transmitting a second control frame to the remote station at Block 1320, and receiving a first data frame via a second antenna pattern of the directional antenna from the remote station at Block 1330. A signal quality of the first control frame received via the first antenna pattern and a signal quality of the first data frame received via the second antenna pattern are measured at Block 1340. The respective measured signal qualities associated with the first and second antenna patterns are compared at Block 1350. The second antenna pattern for transmitting a second data frame by the access point 110 to the remote station 120 is selected at Block 1360 if the measured signal quality associated with the second antenna pattern exceeds the measured signal quality associated with the first antenna pattern by a predetermined threshold. The first control frame received comprises a request-to-send message, and the second control frame transmitted comprises a clear-to-send message. The method ends at Block 1370.

The fourth techniques is a hidden node protection technique that provides a protection mechanism when employing a directional antenna 220b at the access point 110 to reduce or eliminate the occurrence of hidden nodes. Hidden nodes occur when not all of the remote stations 120 in the network 100 can hear communications between the access point 110 and a selected remote station 120, and therefore, those that cannot hear can transmit when the medium is in use. This causes collisions, particularly at the access point 110.

When the access point 110 has data for transmission to a remote station 120, the control process sets the selected antenna direction by scanning the direction table 425 in FIG. 4 to determine if there are potential hidden nodes. For example, the access point 110 may look for remote stations 120 in the opposite direction from the selected antenna direction.

Figure 7:
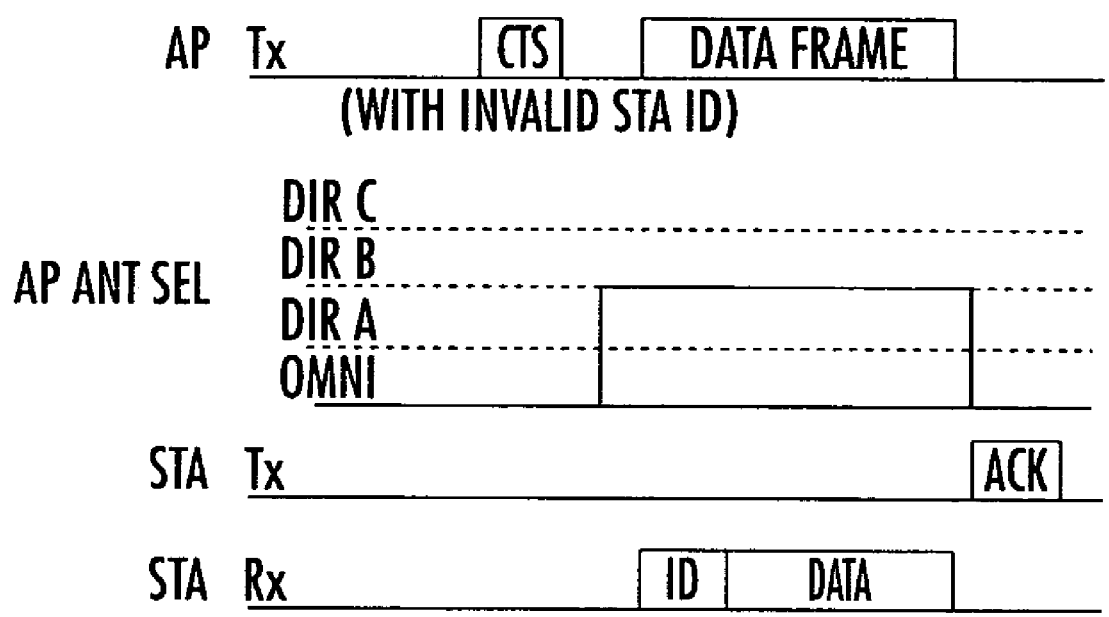
FIG. 7 is a signal diagram using a hidden node technique optionally used by the antenna steering process of FIG. 4.

Referring to the timing diagram of FIG. 7, if the control software determines that a potential for hidden nodes exists, the access point 110 first transmits a CTS message to a known unused MAC address using the omni-directional mode of the antenna 220a. This process serves to tell all of the remote stations 120 in the network that an exchange is to occur and not to transmit until the exchange is finished. The access point 110 then switches to the selected antenna direction for the intended remote station 120 and communications proceed. Another approach to preventing the hidden node problem is to perform a four-way frame exchange protocol (RTS, CTS, data and ACK) with a desired remote station 120.

If the control software determines that there is no potential for a hidden node, the access point 110 may not send the CTS message and communications may start immediately with the access point 110 antenna set to the proper direction. If required by the network protocol, the RTS message can be addressed to the intended receiver, resulting in a CTS message back to the access point 110 as an acknowledgement, as shown in FIG. 5A.

Note that in the process described in reference to FIG. 7, efficiency is improved since the RTS message is not transmitted by the access point 110 since the CTS message is all that is necessary to cause the remote stations 120 to halt transmissions. The remote station 120 indicated in the ID section of the standard 802.11 protocol header ensures the specified remote station receives the data frame.

Figure 14:
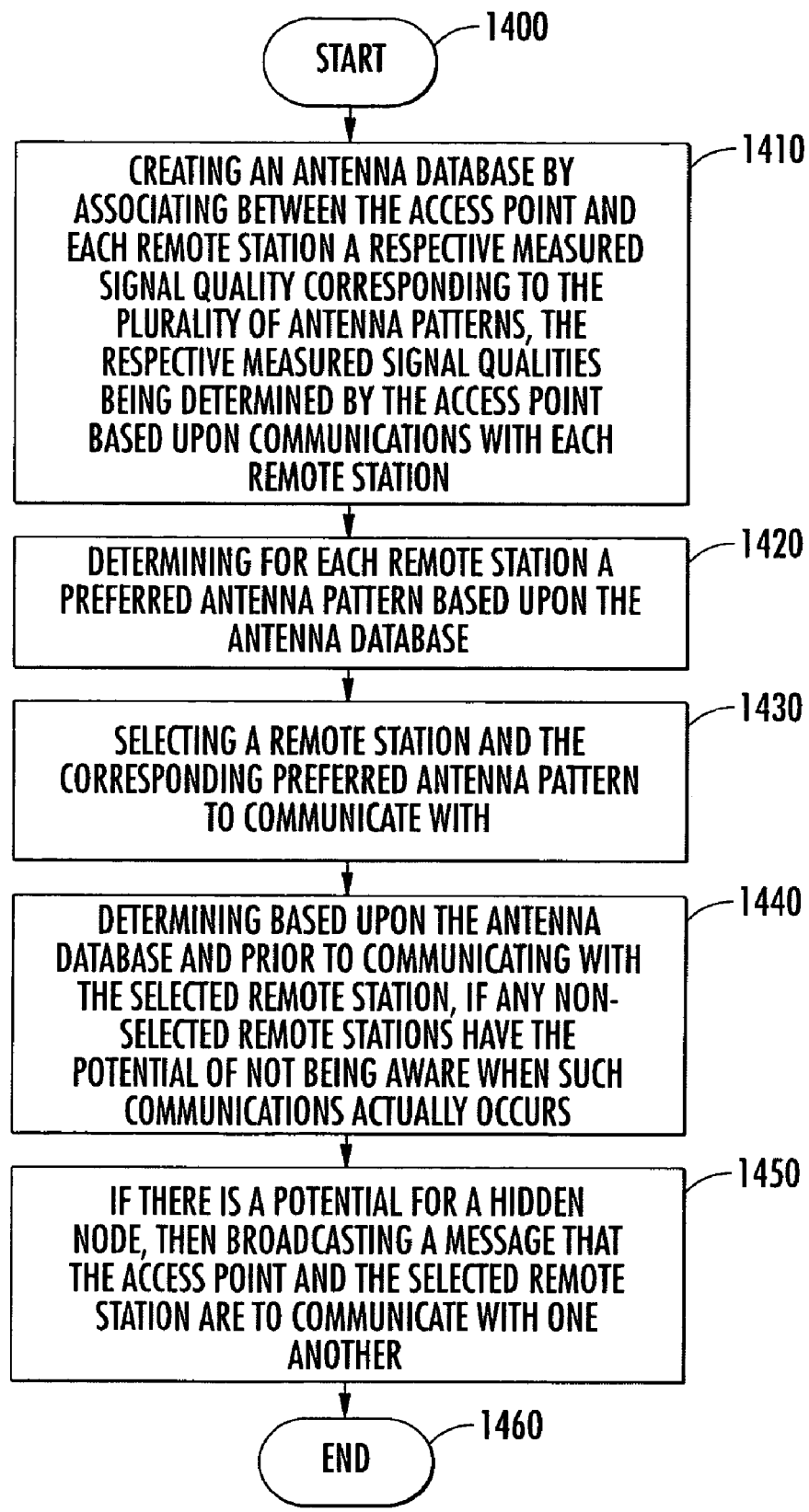
FIG. 14 is a flowchart of a method for operating an access point in a WLAN based upon hidden node recognition in accordance with the present invention.

Referring now to FIG. 14, a flowchart for operating an access point 120 in a WLAN 100 based upon hidden node recognition will be discussed. From the start (Block 1400), the method comprises creating an antenna database by associating between the access point 110 and each remote station 120 a respective measured signal quality corresponding to the plurality of antenna patterns at Block 1410. The respective measured signal qualities are determined by the access point 110 based upon communications with each remote station 120. For each remote station 120 a preferred antenna pattern based upon the antenna database is determined at Block 1420, and a remote station and the corresponding preferred antenna pattern to communicate with are selected at Block 1430. Based upon the antenna database and prior to communicating with the selected remote station, it is determined at Block 1440 if any non-selected remote stations have the potential of not being aware when such communications actually occurs. This is determined by comparing the measured signal quality associated with the preferred antenna pattern for the selected remote station with the respective signal qualities associated with the non-selected remote stations when using the same preferred antenna pattern.

If there is a potential for a hidden node, then a message is broadcast at Block 1450 indicating that the access point 110 and the selected remote station 120 are to communicate with one another. As noted above, this broadcast may be in the form of an unsolicited clear-to-send message via the omni antenna pattern to the remote stations 120. The CTS has an unused address that does not correspond to any of the remote stations 120. Alternatively, a four-way frame exchange protocol (RTS, CTS, data and ACK) is performed with the selected remote station 120 to prevent the hidden node problem. The method ends at Block 1460.

While this invention has been particularly shown and described with references to preferred embodiments thereof, it will be understood by those skilled in the art that various changes in form and details may be made therein without departing from the scope of the invention encompassed by the appended claims. For instance, the access point is not limited to the IEEE 802.11 standard. The antenna algorithm for an access point as discussed above is applicable to other types of local area networks, as readily appreciated by those skilled in the art, such as those defined by the IEEE 802.16 standard.

In addition, other features relating to antenna steering are disclosed in copending patent applications filed concurrently herewith and assigned to the assignee of the present invention and are entitled ANTENNA STEERING FOR AN ACCESS POINT BASED UPON SPATIAL DIVERSITY, Ser. No. 10/870,719; ANTENNA STEERING FOR AN ACCESS POINT BASED UPON PROBE SIGNALS, Ser. No. 10/870,696; and ANTENNA STEERING FOR AN ACCESS POINT BASED UPON CONTROL FRAMES, Ser. No. 10/870,718.

That which is claimed is:

1. A method for operating an access point in a wireless local area network (WLAN), the access point comprising a directional antenna for communicating with a plurality of remote stations, the directional antenna comprising a plurality of antenna patterns, the method comprising:
   creating an antenna database by associating between the access point and each remote station a respective measured signal quality corresponding to the plurality of antenna patterns, the respective measured signal qualities being determined by the access point based upon communications with each remote station;
   determining for each remote station a preferred antenna pattern based upon the antenna database;
   selecting a remote station and the corresponding preferred antenna pattern to communicate with; and
   determining based upon the antenna database and prior to communicating with the selected remote station, if any non-selected remote stations have the potential of not being aware when such communications actually occurs.

2. A method according to claim 1 wherein determining if any non-selected remote stations have the potential of not being aware when such communications actually occurs comprises comparing the measured signal quality associated with the preferred antenna pattern for the selected remote station with the respective signal qualities associated with the non-selected remote stations when using the same preferred antenna pattern.

3. A method according to claim 1 wherein measuring the respective signal qualities comprises determining at least one of a received signal strength indication, a carrier-to-interference ratio, an energy-per-bit ratio, and a signal-to-noise ratio.

4. A method according to claim 1 wherein the plurality of antenna patterns comprise an omni antenna pattern; and wherein if it is determined that at least one of the non-selected remote stations would not be aware when such communications actually occurs, then further comprising transmitting an unsolicited clear-to-send message via the omni antenna pattern to the plurality of remote stations, the clear-to-send message having an unused address that does not correspond to any of the plurality of remote stations.

5. A method according to claim 1 wherein the plurality of antenna patterns comprises an omni antenna pattern; and wherein if it is determined that at least one of the non-selected remote stations would not be aware when such communications actually occurs, then further comprising:
   transmitting in a forward link a request-to-send message via the omni antenna pattern to the plurality of remote stations;
   receiving a clear-to-send message from the selected remote station;
   transmitting a data frame to the selected remote station; and
   receiving an acknowledgement message from the selected remote station.

6. A method according to claim 1 wherein the plurality of antenna patterns comprises an omni antenna pattern; and wherein if it is determined that at least one of the non-selected remote stations would not be aware when such communications actually occurs, then further comprising:
   receiving in a reverse link a request-to-send message from the selected remote station;
   transmitting a clear-to-send message to the selected remote station;
   receiving a data frame from the selected remote station; and
   transmitting an acknowledgement message to the selected remote station.

7. A method according to claim 1 wherein the access point communicates with the plurality of remote stations in a forward link based upon an exchange of packet data comprising a plurality of control frames and a data frame, and creating the antenna database comprises:
   receiving a solicited first control frame via a first antenna pattern of the directional antenna from a first remote station;
   transmitting a first data frame to the first remote station;
   receiving a second control frame via a second antenna pattern of the directional antenna from the first remote station;
   measuring a signal quality of the first control frame received via the first antenna pattern and a signal quality of the second control frame received via the second antenna pattern; and
   repeating the above steps for any remaining antenna patterns.

8. A method according to claim 7 further comprising repeating the receiving and transmitting for measuring a signal quality of the first control frame received via the first antenna pattern and a signal quality of the second control frame received via the second antenna pattern for each remote station.

9. A method according to claim 7 wherein the first control frame received comprises a clear-to-send message, and the second control frame received comprises an acknowledgement message.

10. A method according to claim 1 wherein the access point communicates with the plurality of remote stations in a reverse link based upon an exchange of packet data comprising a plurality of control frames and a data frame, and creating the antenna database comprises:
   receiving a first control frame via a first antenna pattern of the directional antenna from a first remote station;
   transmitting a second control frame to the first remote station;
   receiving a first data frame via a second antenna pattern of the directional antenna from the first remote station;
   measuring a signal quality of the first control frame received via the first antenna pattern and a signal quality of the first data frame received via the second antenna pattern; and
   repeating the above steps for any remaining antenna patterns.

11. A method according to claim 10 further comprising repeating the receiving and transmitting for measuring a signal quality of the first control frame received via the first antenna pattern and a signal quality of the first data frame received via the second antenna pattern for each remote station.

12. A method according to claim 10 wherein the first control frame received comprises a request-to-send message, and the second control frame transmitted comprises a clear-to-send message.

13. A method according to claim 1 wherein the directional antenna comprises an omni angle and a plurality of directional angles, and creating the antenna database comprises:
   selecting a first remote station;
   transmitting a first probe signal via the omni angle of the directional antenna to the first remote station;
   measuring a first probe response signal received via the omni angle from the first remote station responding to the first probe signal;
   transmitting a respective second probe signal via each one of the plurality of directional angles of the directional antenna to the first remote station; and
   measuring a second probe response signal received via each directional angle from the first remote station responding to the respective second probe signal.

14. A method according to claim 13 further comprising:
   selecting a next remote station from the plurality of remote stations;
   repeating the transmitting of the first and second probe signals to the next selected remote station, and the measuring of the first and second probe response signals received from the next selected remote station; and
   repeating the above steps for each of the remaining remote stations from the plurality of remote stations.

15. A method according to claim 13 wherein the first probe signal comprises a request-to-send (RTS) message and the first probe response signal comprises a clear-to-send (CTS) message, and wherein the second probe signal comprises an RTS message and the second probe response signal comprises a CTS message.

16. A method according to claim 1 wherein the access point is operating based upon at least one of an IEEE 802.11 standard and an IEEE 802.16 standard.

17. A method according to claim 1 wherein the directional antenna comprises at least one active element and a plurality of passive elements.

18. An access point for a wireless local area network (WLAN) comprising:
   a directional antenna comprising a plurality of antenna patterns; and
   a controller connected to said directional antenna for control thereof, said controller for communicating with a plurality of remote stations by performing the following
      creating an antenna database by associating with each remote station a respective measured signal quality corresponding to the plurality of antenna patterns, the respective measured signal qualities being determined based upon communications with each remote station,
      determining for each remote station a preferred antenna pattern based upon the antenna database,
      selecting a remote station and the corresponding preferred antenna pattern to communicate with, and
      determining based upon the antenna database and prior to communicating with the selected remote station, if any non-selected remote stations have the potential of not being aware when such communications actually occurs.

19. An access point according to claim 18 wherein said directional antenna comprises at least one active element and a plurality of passive elements.

20. An access point according to claim 18 wherein said controller, for determining if any non-selected remote stations have the potential of not being aware when such communications actually occurs, compares the measured signal quality associated with the preferred antenna pattern for the selected remote station with the respective signal qualities associated with the non-selected remote stations when using the same preferred antenna pattern.

21. An access point according to claim 18 wherein the measured signal qualities comprise at least one of a received signal strength indication, a carrier-to-interference ratio, an energy-per-bit ratio, and a signal-to-noise ratio.

22. An access point according to claim 18 wherein the plurality of antenna patterns comprises an omni antenna pattern; and wherein if said controller determines that at least one of the non-selected remote stations would not be aware when such communications actually occurs, then said controller transmits a clear-to-send message via the omni antenna pattern to the plurality of remote stations, with the clear-to-send message having an unused address that does not correspond to any of the plurality of remote stations.

23. An access point according to claim 18 wherein the plurality of antenna patterns comprises an omni antenna pattern; and wherein if said controller determines that at least one of the non-selected remote stations would not be aware when such communications actually occurs, then said controller performs the following:
   transmitting in a forward link a request-to-send message via the omni antenna pattern to the plurality of remote stations;
   receiving a clear-to-send message from the selected remote station;
   transmitting a data frame to the selected remote station; and
   receiving an acknowledgement message from the selected remote station.

24. An access point according to claim 18 wherein the plurality of antenna patterns comprises an omni antenna pattern; and wherein if said controller determines that at least one of the non-selected remote stations would not be aware when such communications actually occurs, then said controller performs the following:
   receiving in a reverse link a request-to-send message from the selected remote station;

transmitting a clear-to-send message to the selected remote station;

receiving a data frame from the selected remote station; and transmitting an acknowledgement message to the selected remote station.

25. An access point according to claim 24 wherein said controller repeats the receiving and transmitting for measuring a signal quality of the first control frame received via the first antenna pattern and a signal quality of the second control frame received via the second antenna pattern for each remote station.

26. An access point according to claim 24 wherein the first control frame received comprises the clear-to-send message, and the second control frame received comprises the acknowledgement message.

27. An access point according to claim 18 wherein said directional antenna comprises an omni angle and a plurality of directional angles; and wherein said controller performs the following for creating the antenna database:

selecting a first remote station;

transmitting a first probe signal via the omni angle of said directional antenna to the first remote station;

measuring a first probe response signal received via the omni angle from the first remote station responding to the first probe signal;

transmitting a respective second probe signal via each one of the plurality of directional angles of said directional antenna to the first remote station; and measuring a second probe response signal received via each directional angle from the first remote station responding to the respective second probe signal.

28. An access point according to claim 27 wherein said controller further performs the following:

selecting a next remote station from the plurality of remote stations;

repeating the transmitting of the first and second probe signals to the next predetermined remote station, and the measuring of the first and second probe response signals received from the next predetermined remote station; and repeating the above steps for each of the remaining remote stations from the plurality of remote stations.

29. An access point according to claim 27 wherein the first probe signal comprises a request-to-send (RTS) message and the first probe response signal comprises a clear-to-send (CTS) message, and wherein the second probe signal comprises an RTS message and the second probe response signal comprises a CTS message.

30. An access point according to claim 18 wherein said controller is operating based upon at least one of an IEEE 802.11 standard and an IEEE 802.16 standard.

* * * * *